United States Patent [19]

Smith et al.

[11] Patent Number: 4,581,385

[45] Date of Patent: Apr. 8, 1986

[54] CARPET CLEANING COMPOSITION

[76] Inventors: James A. Smith, 40 Birchwood Rd., Old Tappan, N.J. 07675; Betty J. Murphy, 64 Dryden Rd., Upper Montclair, N.J. 07043

[21] Appl. No.: 684,746

[22] Filed: Dec. 20, 1984

Related U.S. Application Data

[63] Continuation-in-part of Ser. No. 511,185, Jul. 6, 1983, and a continuation-in-part of Ser. No. 660,350, Oct. 12, 1984.

[51] Int. Cl.[4] .................... B29D 27/04; C11D 17/04; B24D 3/32
[52] U.S. Cl. .................................. 521/111; 521/159; 521/905; 521/122; 521/918; 521/123; 521/76; 521/52; 210/924
[58] Field of Search ............... 521/111, 159, 905, 122, 521/918, 123, 76, 52; 210/924

[56] References Cited

U.S. PATENT DOCUMENTS

| | | | |
|---|---|---|---|
| B 433,707 | 3/1976 | Froehlich et al. | 252/544 |
| 2,789,953 | 4/1957 | Blackman et al. | 252/88 |
| 3,088,158 | 5/1963 | Boyle et al. | 15/506 |
| 3,533,953 | 10/1970 | Mills et al. | 252/88 |
| 4,127,515 | 11/1978 | MacRae et al. | 521/112 |
| 4,194,993 | 3/1980 | Deal, III | 252/541 |
| 4,271,272 | 6/1981 | Strickman et al. | 521/110 |
| 4,421,526 | 12/1983 | Strickman et al. | 51/296 |
| 4,434,067 | 2/1984 | Malone et al. | 252/88 |

FOREIGN PATENT DOCUMENTS 2015972  4/1970  France.

Primary Examiner—Maurice J. Welsh
Assistant Examiner—M. L. Moore
Attorney, Agent, or Firm—Merchant, Gould, Smith, Edell, Welter & Schmidt

[57] ABSTRACT

A dry-type carpet cleaning composition is disclosed which comprises shreds of a hydrophilic polyurethane foam which incorporates abrasive particles surfactants, and adjuvants such as fragrance, solvents, anti-static agents and fiber emollients. The foam shreds are effective to clean both wet and dry carpeting since they are highly water-absorbent and can be readily removed from the carpet surface when wet.

22 Claims, 2 Drawing Figures

CARPET CLEANING COMPOSITION

CROSS REFERENCE TO RELATED APPLICATIONS

This application is a continuation-in-part of U.S. application Ser. No. 511,185, filed July 6, 1983, and a continuation-in-part of U.S. application Ser. No. 660,350, filed Oct. 12, 1984.

BACKGROUND OF THE INVENTION

In recent years, a wide variety of dry carpet cleaning and deodorizing compositions have become available. One such composition is disclosed in U.S. Pat. No. 4,161,449, and comprises a blend of an inorganic salt carrier, an agglomerating agent such as starch, fragrance and optional amounts of an anti-static agent. In compositions such as those disclosed in U.S. Published Application No. B433,707, and in U.S. Pat. Nos. 4,434,067, 4,194,993 and French Pat. No. 2,015,972 the inorganic carrier salt is wholly or partially replaced by dry porous polymeric particles, which can function as absorbent carriers for cleaning solutions.

Although these compositions are designed to clean carpeting and leave a residue of fragrance or anti-static agent behind, they suffer from a number of disadvantages. In the first place, the use of fine particles of carrier salts or fragmented polymeric substances can lead to unacceptably high amounts of residual dust in and on the carpeting. This dust can soil shoes and clothing and give dark carpeting an unacceptable frosted look. Although dusting can be reduced by the addition of dedusting agents such as mineral oil and glycol ethers, such agents tend to promote the adherence of soil to carpet fibers and counteract the cleaning and anti-soil properties of the powdered compositions. In the second place, agglomerating agents such as starch, flour or talc are often employed to prevent undue scattering or "bounce" of the carrier and to promote even coverage upon application of the product to the carpeting. Such agents are disadvantageous since they also act to promote clumping of the powdered product in the storage container, thus hampering its delivery, e.g. by sprinkling it from a perforated shaker. Finally, the dry-type products presently on the market which incorporate inorganic carrier salts cannot be used on damp or wet carpeting, such as that soiled by excreta, rainwater or food spills, since the salts partially dissolve and cake into a solid mass. Liquid-loaded plastic beads may be less severely affected by moisture, but since they are intended to deliver cleaning fluids to dry carpeting, they are ineffective in the presence of moisture.

Therefore a need exists for a particulate carpet cleaning composition which exhibits an affinity for both dry and wet soils, and which can deliver effective amounts of carpet conditioning and deodorizing adjuvants. Such a composition should also be easy to apply to the soiled carpeting and readily removable without dusting on dry carpeting or caking on wet carpeting.

BRIEF DESCRIPTION OF THE INVENTION

The present invention is directed to a water-absorbent carpet cleaning composition formed by shredding a friable, hydrophilic, solids-loaded polyurethane foam. The preparation of hydrophilic polyurethane foams by the reaction of specially-formulated prepolymer resins with large excesses of water without the need for added catalysts or crosslinking agents is disclosed in U.S. Pat. Nos. 3,890,254; 4,137,200 and 4,160,076. These resins permit the introduction of large amounts of solids into the foam matrices via preformed aqueous slurries of solid particles which are subsequently reacted with the prepolymer resin in order to foam it into the desired specialty product. One such product is the subject of commonly-assigned parent application Ser. No. 511,189, filed July 6, 1983, which is directed to the use of highly-reticulated foam shreds to clean and absorb oil spills, dirt and grime from concrete surfaces.

Foams useful for forming the present compositions can be prepared by foaming a polyurethane prepolymer resin which contains at least two free isocyanate group per resin molecule with an aqueous reactant phase comprising a slurry of solid abrasive particles and which slurry also comprises an amount of a surfactant effective to produce the desired cellular matrix. The aqueous slurry is mixed with the prepolymer so that the final mole ratio of water to the total free isocyanate groups on the prepolymer molecules is within the range of about 5–100:1. These amounts of water react with the free isocyanate groups to release carbon dioxide which blows the prepolymer into a cross-linked foam which is rendered hydrophilic by entrapment of excess water in the cell walls of the foam matrix. In the present compositions, the integral incorporation of the abrasive and aqueous phase into the solid matrix of the foam leaves the cell voids available to absorb and hold large amounts of water. The aqueous phase also can function as a carrier for a wide variety of cleaning, conditioning and deodorizing agents. Such agents include water-miscible or dispersable solvents, anti-static agents, fragrances, fiber emollients and the like. The use of an aqueous cleaning and deodorizing phase to foam the prepolymer resin also eliminates the need to post-add cleaning liquids to pre-formed porous particles. When the prepolymer-slurry mixture is allowed to set in molds, a dense, friable foam bun is formed which is easily shredded or chopped into foam particles of the desired size. These particles are soft and somewhat self-adherent, due to their high surface area and high moisture content.

These properties, when coupled with the high density imparted by the abrasive particles, result in a cleaning composition which can be evenly applied to, and removed from soiled natural or synthetic carpeting without bouncing, blooming or leaving a dusty residue.

Furthermore, the present composition is effective on both dry and wet carpeting. On dry carpeting, the moist foam shreds have a high affinity for particulate soil. When contacted with the carpeting as by brushing or rubbing prior to vacuuming, effective amounts of cleaning, conditioning and odoriferous agents can be transferred from the foam matrix to the carpet fibers via partial release of the entrapped aqueous carrier phase.

On damp or wet carpeting, the hydrophilic foam shreds strongly absorb the aqueous soil by the wicking action of the connecting passages of the foam matrix, thus cleaning and drying the carpeting. Even when loaded to capacity with water, the foam shreds retain their structural integrity and can be readily removed from the carpet, e.g. by vacuuming.

Although the porous nature of the foam shreds contributes to their absorbency, the reticulation and shred size is controlled so that a substantial number of the interconnected cells end within the body of the shreds. This limitation of the number of through-passages in any given shred contributes significantly to the vacuumability of the shreds.

DETAILED DESCRIPTION OF THE INVENTION

Figure 1:

The carpet cleaning compositions of the present invention are prepared by a process comprising forming an aqueous slurry which includes solid abrasive particles and a suspending agent for said particles. The slurry further includes an amount of surfactant effective to form an open-celled foam upon reaction of the aqueous phase with a water-foamable polyurethane prepolymer resin. The surfactant can also function as a fiber emollient and/or an anti-static agent. In the practice of the present invention, nonionic and cationic surfactants are preferred. The aqueous phase may further comprise additional foam-forming and structuring agents such as silicone fluids, additional surfactants, organic solvents and the like which also act to build the cleaning and conditioning power of the finished composition. The fully-formed aqueous slurry is then combined with a water-foamable prepolymer resin and the reaction mixture allowed to foam and cure to form a self-cross-linked, friable polyurethane bun. The bun is chopped or shredded to form the particular foam compositions of the present invention. As used herein the term "bun" intended to refer generally to the foam body which is the precursor of the shredded foam cleaning product, and can include slab stock sheets as well as molded bodies.

Prepolymer Resins

A commercially available class of water-foamable prepolymer resins which yield cross-linked, hydrophilic polyurethane foams upon the addition of stoichiometric excesses of water are those belonging to the Hypol ® series (W. R. Grace & Co.; FHP 3000, 2000, 2000 HD, 2002) which are generally described in U.S. Pat. No. 4,137,200, the disclosure of which is incorporated by reference herein. These liquid resins are prepared by capping mixtures of low molecular weight polyols having 3-8 hydroxyl groups and polyoxyethylene diols with toluene diisocyanate. The capped alcohol mixtures have an average number of free isocyanate groups per molecule which is equal to two or more, i.e. 2-8.

These resins possess molecular weights within the range of about 1300-1400 and have about 1.5-2.5 mEq./g. of free isocyanate groups. Upon being contacted with a molar excess of water, the isocyanate groups hydrolyze to release carbon dioxide gas, thus foaming the resin without the need for added catalysts or blowing agents. The free amino groups formed by the hydrolysis reaction react with unhydrolyzed isocyanate groups to form ureido groups which cross-link and stabilize the foam, while entrapping a part of the excess water in the cell walls, where it acts to impart hydrophilic properties to the foam. The compatibility of the foam matrix with large molar excesses of water is a necessary requirement of resins useful in the practice of the present invention, since large amounts of water are needed to uniformly introduce large amounts of abrasive material into the matrix.

Other poly-$C_2$-$C_3$-alkyleneoxy glycols capped with aromatic isocyanates may be prepared which possess a suitable balance between their extent of cross-linking prior to foaming and their ability to cross-link or to further cross-link during foaming (due to the presence of more than two reactive isocyanate groups per resin molecule), so as to be useful in the practice of the present invention over the entire range of solids and surfactant content. These prepolymer resins are prepared by polymerizing ethylene oxide to yield polyalkylenoxy polyols having a molecular weight of about 900–1100. These polyols are reacted with a stoichiometric excess of a polyisocyanate. Suitable isocyanates include toluene diisocyanate, triphenylmethane-4,4',4"-triisocyanate, benzene-1,3,5-triisocyanate, hexamethylene diisocyanate, xylene diisocyanate, chlorophenylene diisocyanate and mixtures thereof. The useful resins recovered have a somewhat lower number of mEq of free isocyanate groups (NCO) per gram of resin than do the Hypol ® resins, e.g. 1.3–1.5 mEq/gram and exhibit a substantially higher tensile strength when foamed and cured at ambient temperatures to incorporate high percentages of dispersed abrasives.

Commercially available self cross-linking resins include Trepol ® A-62 and TRE STD ® prepolymer resin (Twin Rivers Engineering Co., East Booth Bay, ME), which form acceptable foams upon reaction with at least a stoichiometric excess of water without employing a low molecular weight polyol component to raise the average number of free isocyanate groups per glycol ether molecule to above two. TRE STD ® resin has an average free isocyanate content of about 1.4 mEq./gram, comprises a polyol component having an average molecular weight of about 1000, exhibits a viscosity at 32° C. of 4700 cps and solidifies at 15.5° C.

In the practice of the present invention, useful foams may be formed employing a weight ratio of water to prepolymer resin of 0.5–2.5:1, preferably 0.75–2.0:1. These ranges yield a mole ratio of water to free isocyanate groups of about 20–80:1, preferably about 30–60:1.

Abrasives

Particulate abrasive solids are employed as components of the present cleaning compositions and are dispersed throughout the foam matrix by a suspending agent as described below. The choice of abrasive material may be made from a wide variety of materials of adequate hardness and of a particle size range which will enable them to partially separate from the foam shreds during use and to effectively clean soiled carpet fibers without cutting or unduly abrading them.

Useful abrasives include minerals such as aluminates and silicates, including alumina, silica, zeolites, clays, carborundum, zircon, clays, quartz and the like. Water soluble salts such as sulfates, carbonates, phosphates, silicates and the like can also be employed as abrasives when used in large amounts relative to the amount of water employed, e.g. in ratios of salt to water of about 4–5:1, respectively. For example, when an aqueous reactant phase of this type is combined with prepolymer in a ratio of about 7–5:1 (weight ratio of water to prepolymer of about 0.5–1.5:1), extremely friable foam buns can result which yield highly absorbent shreds. The solids will preferably comprise about 40–80% by weight of the aqueous reactant phase, most preferably about 45–70%. The weight ratio of abrasive to prepolymer which may be used is limited only by the ability of the foamed polymeric matrix to retain the abrasive particles without undue separation and loss of the solid during preparation or shipping. Preferably, the weight of the abrasive used will be from about 100–500% of the prepolymer weight, most preferably 150–300%. These high weight ratios of solids to prepolymer resin yield dense foam buns and shreds which can incorporate about 30–95% of abrasive particles on a dry weight basis.

A preferred abrasive for use in the foams of the present invention is F-4 Feldspar ® (170–200 mesh) available from International Minerals and Chemical Corporation, Mundelein, Ill.

Suspending Agents

The uniform distribution of abrasive particles throughout the foam matrix is assisted by the use of a suspending agent which is added to the aqueous phase in an amount effective to produce a stable dispersion of the particulate abrasive. The inorganic suspending agents also enhance the cleaning properties of the foam shreds.

Useful inorganic agents comprise those of natural or synthetic mineral origin. Preferred gelling agents are the smectite clays such as the saponites and the montmorillonite colloidal clays such as Veegum ®, Van Gel ® (Vanderbilt Minerals, Murray, KY), or Magnabrite ® (American, Colloid Co., Skokie, IL). Inosilicates can also be used, alone or in combination with the clays to produce open-celled foams. Preferred inosilicates are the naturally-occurring calcium metasilicates such as wollastonite, available as the NYAD ® wollastonite series (Processed Minerals Inc., Willsboro, NY). Synthetic sodium magnesium silicate clays, hectorite clays, and fumed silicas can also be used as suspending agents.

Surfactants

One or more foam-structuring surfactants will also be incorporated into the aqueous phase. The surfactant can also function to enhance the cleaning power of the finished composition by dispersing greasy dirt when the foam shreds contact the carpeting. The foam-structuring surfactants are preferably selected from nonionic types which are soluble or dispersible in water.

Preferred nonionic surfactants include the condensation products of ethylene oxide with a hydrophobic polyoxyalkylene base formed by the condensation of propylene oxide with propylene glycol. The hydrophobic portion of these compounds has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include certain of the commercially-available Pluronic ® surfactants (BASF Wyandotte Corp.), especially those in which the polyoxypropylene ether has a molecular weight of about 1500–3000 and the polyoxyethylene content is about 35–55% of the molecule by weight, i.e. Pluronic ® L-62. Other useful nonionic surfactants include the condensation products of $C_8$–$C_{22}$ alkyl alcohols with 2–50 moles of ethylene oxide per mole of alcohol. Examples of compounds of this type include the condensation products of $C_{11}$–$C_{15}$ secondary alkyl alcohols with 3–50 moles of ethylene oxide per mole of alcohol which are commercially-available as the Poly-Tergent ® SLF series from Olin Chemicals or the Tergitol ® series from Union Carbide, i.e. Tergitol ® 25-L-7, which is formed by condensing about 7 moles of ethylene oxide with a $C_{12}$–$C_{15}$ alkanol.

Other nonionic surfactants which may be employed include the ethylene oxide esters of $C_6$–$C_{12}$ alkyl phenols such as (nonylphenoxy)polyoxyethylene ether. Particularly useful are the esters prepared by condensing about 8–12 moles of ethylene oxide with nonylphenol, i.e. the Igepal ® CO series (GAF Corp., New York, NY).

Other useful nonionics include the ethylene oxide esters of alkyl mercaptans such as dodecylmercaptan polyoxyethylene thioether, the ethylene oxide esters of fatty acids such as the lauric ester of polyethylene glycol and the lauric ester of methoxypolyethylene glycol, the ethylene oxide ethers of fatty acid amides, the condensation products of ethylene oxide with partial fatty acid esters of sorbitol such as the lauric ester of sorbitan polyethylene glycol ether, and other similar materials, wherein the mole ratio of ethylene oxide to the acid, phenol, amide or alcohol is about 5–50:1.

The total amount of nonionic surfactant which is used to control the reticulation of the present foams is preferably about 0.1–10%, most preferably 1–5% by weight of the aqueous phase.

Anti-static Agents

It is also highly preferable that the present foam shreds incorporate one or more materials which impart antistatic properties, and correspondingly reduce soil retention and re-deposition. Such compounds also impart anti-soil properties, which improve the long-term ease of carpet cleaning and maintenance. Although many commonly employed nonionic and anionic surfactants possess these properties to some extent, cationic surfactants such as quaternary or tertiary amines are particularly effective as components of the present foams. These materials also function to moderate the cell size when the prepolymer resin is reacted with the aqueous phase.

Cationic amines useful in the present invention include the N-(higher)$C_{14}$–$C_{24}$-alkyl-N-benzyl-quaternary ammonium salts which comprise water solubilizing anions such as halide, e.g., chloride, bromide and iodide; sulfate, methosulfate and the like and the heterocyclic imides such as the imidazolinium salts.

For convenience, the aliphatic quaternary ammonium salts may be structurally defined as follows:

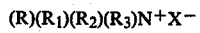

wherein R is benzyl, or lower(alkyl)benzyl; $R_1$ is alkyl of 10 to 24 and preferably 12 to 22 carbon atoms; $R_2$ is $C_{10}$–$C_{24}$-alkyl or $C_1$–$C_4$-alkyl, $R_3$ is lower alkyl of 1 to 4 carbon atoms and X represents an anion capable of imparting water solubility of dispersibility including the aforementioned chloride, bromide, iodide, sulfate and methosulfate. Particularly preferred species of these aliphatic quats include n-$C_{12}$–$C_{18}$-alkyl-dimethylbenzylammonium chloride(myrisalkonium chloride), n-$C_{12}$–$C_{14}$-alkyldimethyl(ethylbenzyl)ammonium chloride(quaternium 14), dimethyl(benzyl)ammonium chloride and mixtures thereof. These compounds are commercially available as the BTC series from Onyx Chemical Co., Jersey City, NJ. For example, BTC 2125M is a mixture of myrisalkonium chloride and quaternium-14.

Other useful aliphatic quats include the N,N-di(higher)-$C_{10}$–$C_{24}$-alkyl-N,N-di(lower)-$C_1$–$C_4$-alkyl-quaternary ammonium salts such as distearyl(dimethyl)ammonium chloride, di-hydrogenated tallow(dimethyl)ammonium chloride, di-tallow(dimethyl)ammonium chloride, distearyl(dimethyl)ammonium methyl sulfate, and di-hydrogenated tallow(dimethyl)ammonium methyl sulfate.

Other useful quaternary ammonium anti-static agents include the acid salts of (fatty acid)amidoalkyl(dialkyl)-amines of the general formula:

$$[A(C=O)-R-NH(R_1)(R_2)]^+X^-$$

wherein A is a $C_{14}$–$C_{24}$ normal or branched alkyl group, R is ethylene, propylene or butylene, $R_1$ and $R_2$ are both $C_1$–$C_4$-(lower)alkyl or together form the moiety —$CH_2$—$CH_2YCH_2$—$CH_2$—, wherein Y is NH, O or $CH_2$, and X is the salt of an organic acid. Compounds of this class are commercially available from Croda, Inc. New York, NY, as the Incromate ® series, e.g. Incromate ® IDL [isostearamidopropyl(dimethyl)amine lactate], Incromate ® ISML [isostearamidopropyl morpholinium lactate] and Inchromate ® CDP [cocamidopropyl(-dimethyl)amine propionate].

Preferred imidazoliniums include: (methyl-1-tallow-amido)ethyl-2-tallow imidazolinium methyl sulfate; available commercially from Sherex Chemical Co. under the tradename Varisoft ® 475; and (methyl-1-oleylamido)ethyl-2-oleyl imidazolinium methyl sulfate; available commercially from Sherex Chemical Co. under the tradename Varisoft ® 3690.

About 0.05–10%, preferably about 0.1–5% of one or more of these quaternary ammonium or imidazolinium antistatic agents will be incorporated into the aqueous phase used to produce the present foams. Mixtures of n-(higher)alkyl(benzyl)di(lower)alkyl ammonium salts and $C_{14}$–$C_{24}$-alkylamidoalkyl-tert-amine salts have been found especially effective in imparting anti-static, anti-soil properties to the present foam cleaners and are preferably employed in weight ratios of about 1:2–8, respectively.

Silicone Fluids

Silicone fluids can also be incorporated into the aqueous phase as foam cell initiating and structuring agents and are selected from those which function to control cell size and reticulation. These fluids also function as fiber emollients, improving the vacuumability of the foam shreds and imparting a desirable sheen to the carpeting. Useful classes of silicone fluids include the linear dimethylpolysiloxanes or the tetrameric or pentameric cyclic siloxanes(cyclomethicones) which are available from Rhone-Poulenc, Inc. (Monmouth Junction, NJ) as the Rhodorsil ® 47V series or from Dow Corning as the Dow Corning ® 200 fluid series in a wide range of viscosities (i.e., 10–10,000 cps.). When used as a component of the present foams, about 0.1–15%, preferably 1–10% by weight of the aqueous phase of a silicone fluid of about 0.5–150 cps viscosity, preferably about 25–100 cps, can be employed.

Organic Solvents

The aqueous reactant phase also preferably includes a water-soluble or water-miscible organic solvent or solvent mixture which acts to enhance the ability of the foam shreds to remove greasy or oily soil. The solvent can also help to dissolve or disperse water-insoluble components such as silicone oils and fragrance oils in the aqueous phase. Solvents such as m-pyrol, tetrahydrofurfuryl alcohol (THFA) or mixtures thereof are preferred due to their low toxicity, but solvents such as butyl carbitol, alkyl cellusolves, mineral spirits, propylene glycol ethers, propylene glycol ether acetates (Arcosolvs ®) and the like may be used in amounts of up to about 15% by weight of the aqueous phase, preferably in amounts of about 1–10% by weight of the aqueous phase.

Odoriferous Agent

Minor but effective amount of a volatile odoriferous agent selected so as to be chemically-compatible with the above-described surfactants are preferably included in the aqueous phase to deodorize the carpet and freshen room air. Useful odoriferous agents include fragrances, for instance about 0.01–10%, preferably about 0.05–5% of floral oils such as rose oil, lavender, lilac, jasmine, vanilla, wisteria, lemon, apple blossom, or compounds bouquets such as spice, aldehydic, woody, oriental, and the like.

Minor amounts of other foam-compatible adjuvants, such as dyes, anionic or amphoteric surfactants, additional fiber emollients, flame retardants and the like, may be introduced into the present foam products in effective amounts either via the aqueous or resin phase or by treating the final product with the adjuvants as by spraying, mixing, etc. When employed in the present products, such adjuvants will commonly be present at a level of up to about 5–10% by weight of the finished product.

Therefore, the foam products of the present invention are formed by mixing and foaming the prepolymer resin with the aqueous reactant phase.

A preferred aqueous reactant phase would comprise about 15–65%, most preferably about 20–55% water, about 45–70% abrasive particles, about 0.1–5% of a clay suspending agent, about 1–5% by weight of a non-ionic surfactant, about 0.1–5% of a cationic amine anti-static agent, about 1–10% of a silicone fluid, and optionally, about 0.5–15% of an organic solvent in admixture with minor amounts of dye and a volatile odoriferous agent. The foam matrix of the cleaner product would typically be formed by mixing together the abovedescribed aqueous phase with the prepolymer resin in a weight ratio of aqueous phase to prepolymer resin of about 20–1:1, preferably about 10–2:1, most preferably about 7.5–2.5:1. The preferred mole ratio of water to moles of available isocyanate groups can thereby be adjusted to be within the range of about 30–60:1.

In a typical procedure, the suspending agent is mixed into the total water and the abrasive particles added with further stirring to yield a stable dispersion. The nonionic surfactant is then added to the slurry along with the silicone fluid, additional surfactants, organic solvents, the fragrance and other adjuvants. The stirred aqueous phase is brough to about 60°–85° F. and blended in the desired weight ratio with the heated (90°–110° F.) prepolymer resin in the mixing chamber of a foam-spraying machine. The foaming, exotherming mixture is sprayed into open or closed forms and allowed to set at ambient temperatures. The resultant solids-loaded foam buns are shredded and screened to yield the final product which is weighed and packaged for shipping.

The foam buns formed by this process are of relatively high density (i.e., about 0.2–0.6 g/cc) but have a much lower tensile strength than is normally desirable or obtained for other polyurethane-type foams. Buns of polyurethane foams which have been formulated so as to retain their integrity as, for example, sponges, abrasive pads, padding and the like typically exhibit tensile strengths of about 30–60 psi as measured by standard ASTM methods (D1682), whereas the foam buns of the present invention have tensile strengths of less than about 10 psi, preferably less than 8 psi, most preferably less than 3 psi. These low tensile strengths permit the buns to be facilely shredded with the expenditure of minimal energy and yield shreds which are soft and somewhat self-adhering; properties which are useful to ensure uniform, complete coverage of the soiled carpeting without bouncing or clumping. Although the present foam buns, and the shreds derived therefrom, exhibit low tensile strengths, they also exhibit unexpectedly high elongation at break values, typically greater than about 500–600%. These values provide confirmation for the low reticulation (substantially closed cells) exhibited by the present foam matrix.

The interaction of the shreds with the carpet fibers (penetration) as well as the pickup (vacuumability) of the shreds after they have performed their cleaning function can be enhanced by adjusting the shred size. The preferred shredded foam particle size for the present compositions is about 5–20 mesh (U.S. Standard Sieve series), most preferably about 6–15 mesh.

Foam buns as prepared within the above-described parameters yield shreds within a useful free-flow density range of about 0.1–0.5 g/cc, preferably 0.15–0.25 g/cc, as measured after pouring a column of freshly prepared shreds into a 500 ml cylinder without tamping at ambient temperature. The most dense shreds are prepared when the ratio of aqueous phase to prepolymer resin is at the higher portion of the useful range for any given proportion of abrasive incorporated within the aqueous phase. Lower ratios of aqueous phase to prepolymer will likewise produce less-dense, fluffier foams. For example, for an aqueous phase incorporating about 45–55% powdered mineral solids as the abrasive, the useful weight ratio of aqueous phase to a Hypol ®-type prepolymer is about 20:1 to about 1:1, preferably 10–2:1.

The invention will be further described by reference to the following detailed examples.

EXAMPLE I

A reaction kettle equipped with turbine stirring was charged with 36.4 lbs. of deionized water and 1.54 lbs. of a magnesium aluminum silicate suspending agent (Vangel ® ES) was sifted in. Mixing was continued for about one hour. Powdered feldspar (Feldspar F-4, 50.9 lbs.) was slowly added and the resultant slurry mixed until uniform. To the stirred slurry was added 6.32 lbs. of silicone fluid (Dow 200 fluid), 1.76 lbs. of Pluronic ® L-62 nonionic surfactant, 1.25 lbs. of fragrance and 0.60 lbs of a mixture of n-alkyl($C_{12}$–$C_{18}$)dimethyl(benzyl)ammonium chloride and n-alkyl($C_{12}$–$C_{14}$)dimethyl(ethylbenzyl)ammonium chloride (50% actives; BTC 2125M), following by 1.25 lbs. of isostearamidopropyl(-dimethyl)amine lactate (Incromate ® IDL). Mixing was continued to yield a homogeneous aqueous reactant phase.

The aqueous reactant phase was heated to 80° F. and combined in a 4:1 ratio with Hypol ® 2000 in the mixing chamber of a foam-spraying machine. The Hypol prepolymer resin had been preheated to 100° F. prior to introduction into the machine. Portions of the foaming mixture were sprayed into 17.5"×3.5"×8" polyethylene-lined boxes to form 3.8 lb. buns which set and were de-boxed after 5 minutes.

The flexible buns were allowed to cool to room temperature and then were fed into a rotary blade shredder to form shreds of a dense, open-celled foam of 8, 10, 14 and 20 mesh size, respectively. The samples exhibited a free flow bulk density of 0.15–0.25 g/cc. When 500 cc were tapped down (3X) in a graduated cylinder, the particle density increased to 0.3–0.45 g/cc.

Similar density ranges were observed for samples of 10 and 14 mesh particles prepared by blending the aqueous phase and the prepolymer resin in ratios of 3:1, 4.5:1 and 5:1.

When contacted with a 5-fold weight excess of distilled water for 2 minutes and drained for 5 minutes, all of these samples were capable of absorbing 2–3 times their weight in water.

A single foam shred prepared according to the procedure of Ex. I (8 mesh) is shown in FIG. 1, which is a photographic enlargement (40×). As demonstrated by the figure, the shred structure is not reticulated, but rather is formed from a multiplicity of spheres of the foam matrix, thus providing the shred with an extremely high surface area.

Figure 2:
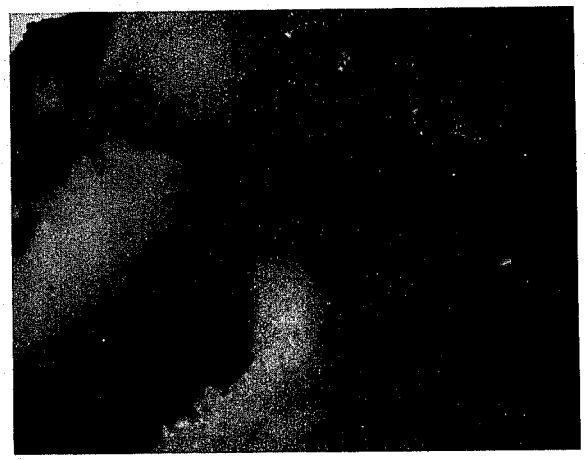

A single foam shred prepared according to the procedure of Ex. I (8 mesh) is shown in FIG. 2, in photographic enlargement (70×). The dark angular bodies apparent in the matrix in the upper left of the figure may be individual abrasive crystals, while the translucent spherical globules may be formed from matrix-bound solvents and surfactants.

Undue shred bounce (scattering) was not observed, either upon application (by sprinkling) or upon contact with the vacuum cleaner beater-brush. The foam shreds prepared using 5:1 and 4.5:1 ratios of aqueous phase to prepolymer exhibited minimal bounce both upon application and removal, due to their somewhat higher densities (0.2–0.25 g/cc, free flow).

The samples could be evenly applied and vacuumed up from areas of wet and dry synthetic or natural fiber carpeting. As the shred size increased, bounce tended to increase, but the foam shreds of 8–10 mesh were somewhat more easily removed from both wet and dry carpeting due to their lower self-adherence when wet and the lower deposition of residual foam particles. However, all of the samples tested effectively cleaned dry carpeting with no or insubstantial scattering and residue deposition and could be vacuumed from wet carpeting when fully water-loaded. In both cleaning situations, the fragrance imparted a pleasant residual odor to the carpeting and room air.

EXAMPLE II

Foam shreds which were prepared by foaming and shredding the compositions listed on Table I according to the procedures of Example I also performed satisfactorily to clean and condition wet and dry carpeting.

TABLE I

| Ingredient | A | B | C | D | E |
|---|---|---|---|---|---|
| Water | 21.10 | 20.80 | 31.10 | 29.50 | 23.00 |
| Suspending Agent* | 1.00 | 1.21 | 1.23 | 1.25 | 1.23 |
| Feldspar powder | 40.72 | 39.90 | 40.72 | 40.60 | 40.72 |
| Dow 200 Fluid | 14.06 | 13.80 | 3.06 | 7.50 | 5.06 |
| Pluronic ® L-62 | 1.41+ | 1.40 | 1.41 | 1.42 | 2.00++ |
| Fragrance | 1.00 | 0.98 | 1.00 | 1.50 | 1.00 |
| Cationic Amine Antistat # | 0.48 | 1.48 | 1.48 | 1.48 | 1.48 |
| Solvent | — | — | — | — | 5.50*** |

TABLE I-continued

| Ingredient | A | B | C | D | E |
|---|---|---|---|---|---|
| Hypol ® 2000 | | 20.00** | 20.00 | 20.00 | 16.70 | 20.00 |

*Magnabrite ® (A-C); Vangel ® ES (D-E).
+Fragrance pre-blended with Pluronic.
BTC-2125M (50% actives)(A); 0.48% BTC-2125M (50%) + 1.0% Incromate ® ISML or Incromate ® IDL (B-E).
**Aqueous phase cooled to room temperature prior to mixing with Hypol.
++Igepal ® CO-920, nonionic surfactant.
***4.0% THFA + 1.5% m-pyrol.

The bun of Ex. IID exhibited a tensile strength of 2.1 psi and an elongation at break of 663.8%. The tensile strength and elongation at break measurements represented an average of ten runs conducted according to ASTM D-1682 (2.54 cm cut strip method).

The invention has been described with reference to various specific and preferred embodiments and techniques. However, it should be understood that many variations and modifications may be made while remaining within the spirit and scope of the invention.

We claim:

1. A water absorbent carpet cleaning composition comprising shreds of a hydrophilic, polyurethane foam having substantially closed cells, wherein the walls of said cells incorporate abrasive particles and an aqueous phase, and wherein said shreds are obtained from a friable foam bun having a tensile strength of less than about 10 psi.

2. The composition of claim 1 wherein said shreds have a density of about from 0.1-0.5 g/cc and a shred size of about 5-20 mesh.

3. The composition of claim 1 wherein said shreds incorporate about 30-95% by weight of said abrasive particles on a dry weight basis.

4. The composition of claim 1 wherein said cell walls further incorporate particles of an inorganic dispersing agent.

5. The composition of claim 1 wherein the aqueous phase comprises a nonionic surfactant and a cationic amine anti-static agent.

6. The composition of claim 5 wherein the anti-static agent comprises a quaternary ammonium salt.

7. The composition of claim 5 wherein the anti-static agent comprises the acid salt of an alkylamidoalkyl(dimethyl)amine.

8. The composition of claim 1 wherein the aqueous phase comprises a silicone fluid.

9. The composition of claim 1 wherein the aqueous phase comprises an organic solvent selected from the group consisting of tetrahydrofurfuryl alcohol, metapyrol or mixtures thereof.

10. The composition of claim 1 wherein the aqueous phase comprises an odoriferous agent.

11. The composition of claim 1 wherein said foam shreds substantially have a structure selected from those shown in FIGS. 1-2.

12. A water absorbent carpet cleaning composition prepared by a process comprising:
(a) foaming an aqueous reactant phase comprising about 45-70% of abrasive solid particles, about 0.1-5% by weight of a clay suspending agent, about 0.1-10% of a nonionic surfactant about 0.05-10% of a cationic amine anti-static agent, about 1-10% silicone fluid and about 15-65% water;
(b) mixing said aqueous reactant phase with a water-foamable prepolymer resin which contains at least 2 free isocyanate groups per resin molecule so that the final mole ratio of water to total free isocyanate groups is within the range of about 5-100:1, thereby converting said resin into a hydrophilic, polyurethane foam bun; and
(c) shredding said foam bun.

13. The composition of claim 12 wherein said shredded foam has a density of about 0.1-0.5 g/cc and a shred size of about 5-20 mesh.

14. The composition of claim 12 wherein the aqueous reactant phase further comprises about 0.01-10% by weight of fragrance.

15. The composition of claim 14 wherein the aqueous phase further comprises about 0.5-15% of an organic solvent.

16. A water absorbent carpet cleaning composition prepared by a process comprising:
(a) forming an aqueous reactant phase comprising about 20-55% by weight of water, about 0.1-10% of a nonionic surfactant, about 0.1-5% by weight of a cationic amine anti-static agent, about 1-10% by weight of a polysiloxane silicone fluid, about 1-15% of an organic solvent, about 25-60% of abrasive mineral particles, about 0.1-5% of a clay suspending agent, and about 0.01-10% fragrance;
(b) mixing said aqueous reactant phase with a water-foamable prepolymer resin in a weight ratio of aqueous phase to prepolymer of about 20-1:1, said prepolymer resin comprising a toluene diisocyanate-capped polyalkoxylene ether polyol having a molecular weight within the range of about 1300-1400 and comprising about 1.5-2.5 mEq/g of isocyanate groups, so as to convert such resin into a hydrophilic, friable polyurethane foam bun having a tensile strength of less than about 8 psi; and
(c) shredding said bun into foam shreds having a free-flow density of about 0.15-0.25 g/cc.

17. The composition of claim 16 wherein said aqueous phase is heated to about 60°-85° F. and mixed with said prepolymer resin which is heated to about 90°-110° F.

18. The composition of claim 16 wherein said aqueous phase and said resin phase are mixed in a ratio of about 10-2:1.

19. The composition of claim 16 wherein the nonionic surfactant comprises the condensation product of a polyoxypropylene ether and polyoxyethylene ether wherein the polyoxypropylene ether has a molecular weight of about 1500-3000 and the polyoxyethylene content is about 35-55% by weight of the surfactant molecule, and wherein the cationic anti-static agent comprises myrisalkonium chloride.

20. The composition of claim 16 wherein the abrasive mineral particles comprise about 45-55% by weight of the aqueous phase.

21. A method for cleaning soiled natural or synthetic carpeting characteristics thereto which comprises applying an effective amount of the composition of claims 1, 12 or 16 to the surface of said soiled carpeting, and thereafter removing said composition.

22. The method of claim 21 wherein said carpeting is soiled with aqueous soil.

* * * * *

UNITED STATES PATENT AND TRADEMARK OFFICE
CERTIFICATE OF CORRECTION

PATENT NO. : 4,581,385
DATED : April 8, 1986
INVENTOR(S) : James A. Smith and Betty J. Murphy It is certified that error appears in the above-identified patent and that said Letters Patent is hereby corrected as shown below:

On the first page, before "[21] Appl. No.: 684,746" insert

--[73] Assignee: Creative Products Resource Associates, Ltd., Clifton, N.J.--.

In line 3 of the Abstract, for "particles", read --particles,"--

In Col. 2, line 13, for "group" read --groups--.

In Col. 2, line 32, for "dispersable" read --dispersible--.

In Col. 8, line 7, for "amount" read --amounts--.

In Col. 8, lines 38-39, for "above described" read --above-described--.

In Col. 8, line 52, for "brough" read --brought--.

Signed and Sealed this

Twenty-third Day of September 1986

[SEAL]

Attest:

DONALD J. QUIGG

Attesting Officer

Commissioner of Patents and Trademarks